(12) United States Patent
Migault

(10) Patent No.: US 11,025,538 B2
(45) Date of Patent: Jun. 1, 2021

(54) NETWORK SERVICE CONTEXT

(71) Applicant: Daniel Migault, Montreal (CA)

(72) Inventor: Daniel Migault, Montreal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/744,420

(22) PCT Filed: Jul. 18, 2016

(86) PCT No.: PCT/IB2016/054272
§ 371 (c)(1),
(2) Date: Jan. 12, 2018

(87) PCT Pub. No.: WO2017/013574
PCT Pub. Date: Jan. 26, 2017

(65) Prior Publication Data
US 2018/0205646 A1    Jul. 19, 2018

Related U.S. Application Data

(60) Provisional application No. 62/193,713, filed on Jul. 17, 2015.

(51) Int. Cl.
| | |
|---|---|
| *H04L 12/715* | (2013.01) |
| *H04L 12/721* | (2013.01) |
| *H04L 12/46* | (2006.01) |
| *H04L 12/741* | (2013.01) |
| *H04L 29/06* | (2006.01) |

(52) U.S. Cl.
CPC .......... *H04L 45/64* (2013.01); *H04L 12/4633* (2013.01); *H04L 45/38* (2013.01); *H04L 45/66* (2013.01); *H04L 45/74* (2013.01); *H04L 69/22* (2013.01)

(58) Field of Classification Search
CPC ......... H04L 45/64; H04L 69/22; H04L 45/74; H04L 12/4633; H04L 45/66; H04L 45/38
See application file for complete search history.

(56) References Cited

U.S. PATENT DOCUMENTS

| | | | |
|---|---|---|---|
| 2010/0208730 A1* | 8/2010 | Henderson | H04L 12/413 370/389 |
| 2014/0334488 A1* | 11/2014 | Guichard | H04L 69/22 370/392 |
| 2014/0362857 A1 | 12/2014 | Guichard et al. | |
| 2015/0103827 A1* | 4/2015 | Quinn | H04L 49/70 370/392 |
| 2015/0131484 A1 | 5/2015 | Aldrin | |

(Continued)

OTHER PUBLICATIONS

Paul Quinn et al., Service Function Chaining, Creating a Service Plane Using Network Service Header (NSH), Dec. 1, 2014, 20 pages.

(Continued)

*Primary Examiner* — Harry H Kim
(74) *Attorney, Agent, or Firm* — David J Rahmer, Ericsson Canada Inc.

(57) ABSTRACT

Systems and methods are provided for packet handling and steering in a service function chaining network such that the full metadata associated with a packet need not be appended to the packet itself.

22 Claims, 13 Drawing Sheets

(56) References Cited

U.S. PATENT DOCUMENTS

| | | | | |
|---|---|---|---|---|
| 2015/0381563 A1* | 12/2015 | Seo | ................... | H04L 61/2007 |
| | | | | 370/401 |
| 2016/0099853 A1* | 4/2016 | Nedeltchev | ......... | H04L 43/0888 |
| | | | | 370/253 |
| 2016/0112481 A1* | 4/2016 | Pani | ................... | H04L 12/4633 |
| | | | | 370/390 |

OTHER PUBLICATIONS

J. Halpern et al.: Service Function Chaining (SFC) Architecture, Network Working Group, Internet Draft, Mar. 6, 2015, 28 pages.
M. Boucadair et al., Service Function Chaining: Design Considerations, Analysis & Recommendations, SFC Internet Draft, Oct. 22, 2014, 23 pages.
P. Quinn et al., Network Service Header, Network Working Group, Internet Draft, Mar. 24, 2015, 42 pages.
ISR from corresponding application PCT/IB2016/054272.

\* cited by examiner

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Base Header                                                   |
+-+-+-+-+-+-+-+-+-+-+-+-+-+-+-+-+-+-+-+-+-+-+-+-+-+-+-+-+-+-+-+-+
| Service Path Header                                           |
+-+-+-+-+-+-+-+-+-+-+-+-+-+-+-+-+-+-+-+-+-+-+-+-+-+-+-+-+-+-+-+-+
|                                                               |
~ Context Headers                                               ~
|                                                               |
+-+-+-+-+-+-+-+-+-+-+-+-+-+-+-+-+-+-+-+-+-+-+-+-+-+-+-+-+-+-+-+-+
```

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|O|C|R|R|R|R|R| Length    | MD-type=0x1   | Next Protocol |
+-+-+-+-+-+-+-+-+-+-+-+-+-+-+-+-+-+-+-+-+-+-+-+-+-+-+-+-+-+-+-+-+
| Service Path ID                              | Service Index |
+-+-+-+-+-+-+-+-+-+-+-+-+-+-+-+-+-+-+-+-+-+-+-+-+-+-+-+-+-+-+-+-+
| Network Platform Context                                      |
+-+-+-+-+-+-+-+-+-+-+-+-+-+-+-+-+-+-+-+-+-+-+-+-+-+-+-+-+-+-+-+-+
| Network Shared Context                                        |
+-+-+-+-+-+-+-+-+-+-+-+-+-+-+-+-+-+-+-+-+-+-+-+-+-+-+-+-+-+-+-+-+
| Service Platform Context                                      |
+-+-+-+-+-+-+-+-+-+-+-+-+-+-+-+-+-+-+-+-+-+-+-+-+-+-+-+-+-+-+-+-+
| Service Shared Context                                        |
+-+-+-+-+-+-+-+-+-+-+-+-+-+-+-+-+-+-+-+-+-+-+-+-+-+-+-+-+-+-+-+-+
```

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|O|C|R|R|R|R|R|R|  Length    |  MD-type=0x2  | Next Protocol |
+-+-+-+-+-+-+-+-+-+-+-+-+-+-+-+-+-+-+-+-+-+-+-+-+-+-+-+-+-+-+-+-+
| Service Path ID                                | Service Index |
+-+-+-+-+-+-+-+-+-+-+-+-+-+-+-+-+-+-+-+-+-+-+-+-+-+-+-+-+-+-+-+-+
|                                                                |
~ Optional Variable Length Context Headers                       ~
|                                                                |
+-+-+-+-+-+-+-+-+-+-+-+-+-+-+-+-+-+-+-+-+-+-+-+-+-+-+-+-+-+-+-+-+
```

NETWORK SERVICE CONTEXT

CROSS REFERENCE TO RELATED APPLICATIONS

This application claims the benefit of priority to previously filed U.S. Provisional Patent Application No. 62/193,713 entitled "NETWORK SERVICE CONTEXT" filed on Jul. 17, 2015, the contents of which are incorporated herein by reference.

TECHNICAL FIELD

This disclosure relates generally to systems and methods for managing service function chaining networks.

BACKGROUND

Architectures related to Service Function Chaining (SFC) have been designed to steer communications through a specific order of Service Functions (SFs). More specifically, the delivery of end-to-end service often involves various network functions such as Network Address Translation (NAT), Deep Packet Inspection (DPI), HTTP enrichment, and/or content caching for example. These services are applied to traffic in a given order that is defined as a SFC. The Internet Engineering Task Force (IETF) has defined aspects related to SFC architecture as described in the IETF draft titled "Service Function Chaining (SFC) Architecture" [draft-ietf-sfc-architecture].

In computer and communication networks, an overlay network is a network that is built on top of another, underlying network. Overlay network nodes are connected by virtual or logical links which can be mapped to the underlying (e.g. physical) links.

Network Service Header (NSH) described in IETF draft "Network Service Header" [draft-ietf-sfc-nsh], provides a mechanism to add information specific to each packet steered from one SF to another. This information can be stored in metadata or inside a Mandatory Context Header. The NSH can also provide information to steer packet traffic from one SF to another. The traffic can be composed of L2 frames or L3 frames. A SFC encapsulation step adds the NSH information to these frames, so that each frame can be associated with its metadata, and then encapsulates the frame with the added NSH. The NSH and the frame are then transported from one SF (or equivalent entity) to another using an overlay network. Typically NSH considers Generic Routing Encapsulation (GRE) over Internet Protocol (IP), Ethernet encapsulation and Virtual Extensible LAN (VxLAN).

FIG. 1a illustrates a Network Service Header format 100 as defined in the "Network Service Header" IETF draft. The Base Header provides information about the service header and the payload protocol. The Service Path Header provides path identification and location within a path with the Service Path ID and Service Index fields. The Context Headers can carry opaque metadata and variable length encoded information.

The Base Header uses the metadata (MD) type parameter to indicate the format of NSH beyond the base header and the type of metadata being carried. MD type=0x1, shown in FIG. 1b, can be used to indicate that the format of the header includes fixed length context headers. This is a fixed header format and the only flexibility it provides is having four Mandatory Context Headers (Network Platform Context, Network Shared Context, Service Platform Context, Service Shared Context) that are each 32 bit fields. MD type=0x2, shown in FIG. 1c, can be used to not mandate any headers beyond the base header and service path header, and may contain optional variable length context information that can be used for any sort of metadata. The resulting NSH header can thus be either of type 0x1 with 6*32 bits or of type 0x2 with a size greater the 64 bits depending on the options used. The size of both of these resulting NSH headers can exceed the desired overhead to be used for SFC.

Therefore, it would be desirable to provide a system and method that obviate or mitigate issues that can arise with the above described systems.

SUMMARY

It is an object of the present invention to obviate or mitigate at least one disadvantage of the prior art.

In a first aspect of the present invention, there is provided a method for processing inbound SFC network traffic, comprising receiving a packet at a first network node over an overlay network, the packet including a network service context indicator. A set of SFC parameters is retrieved in accordance with the network service context indicator. A network service header is generated based at least in part on the set of SFC parameters. The packet is modified to include the generated network service header and forwarded to a second network node in accordance with the generated network service header.

In another aspect of the present invention, there is provided a first network node comprising circuitry including a processor and a memory, the memory containing instructions executable by the processor whereby the first network node is operative to receive an inbound packet at a first network node over an overlay network, the packet including a network service context indicator. The first network node retrieves a set of SFC parameters in accordance with the network service context indicator. The first network node generates a network service header based at least in part on the set of SFC parameters. The first network node modifies the packet to include the generated network service header and forwards the modified packet to a second network node in accordance with the generated network service header.

In another aspect of the present invention, there is provided an overlay network endpoint node configured to process inbound SFC network traffic, comprising a receiving module, a packet processing module and a transmitting module. The receiving module is operative to receive a packet over an overlay network, the packet including a network service context indicator. The packet processing module is operative to retrieve a set of SFC parameters in accordance with the network service context indicator, to generate a network service header based at least in part on the set of SFC parameters and to modify the packet to include the generated network service header. The transmitting module is operative to forward the modified packet to a second network node in accordance with the generated network service header.

In some embodiments, the received packet further includes at least one network service parameter. The network service header can be generated further based on the network service parameter.

In some embodiments, the second network node can be a service function indicated as a destination in the generated network service header.

In some embodiments, the set of SFC parameters can be retrieved further in accordance with the overlay network over which the packet was received.

In some embodiments, the received packet can be decapsulated to remove an overlay network header.

In some embodiments, modifying the packet can include appending the generated network service header to the packet.

In some embodiments, the set of SFC parameters can be stored at the first network node.

In another aspect of the present invention, there is provided a method for processing outbound SFC network traffic, comprising receiving a packet at a first network node, the received packet including a network service header, the network service header including at least one SFC parameter. A network service context template is retrieved in accordance with the received packet. Responsive to determining that a first SFC parameter in the network service header is included in the network service context template, the network service header of the packet is modified to remove the first SFC parameter. The modified packet is encapsulated to include a network service context indicator corresponding to the network service context template and transmitted over an overlay network.

In another aspect of the present invention, there is provided a first network node comprising circuitry including a processor and a memory, the memory containing instructions executable by the processor whereby the first network node is operative to receive an outbound packet at a first network node, the received packet including a network service header, the network service header including at least one SFC parameter. A network service context template is retrieved in accordance with the received packet. Responsive to determining that a first SFC parameter in the network service header is included in the network service context template, the network service header of the packet is modified to remove the first SFC parameter. The modified packet is encapsulated to include a network service context indicator corresponding to the network service context template and transmitted over an overlay network.

In another aspect of the present invention, there is provided an overlay network endpoint node configured to process outbound SFC network traffic, comprising a receiving module, a packet processing module and a transmitting module. The receiving module is operative to receive a packet including a network service header, the network service header including at least one SFC parameter. The packet processing module is operative to retrieve a network service context template and, responsive to determining that a first SFC parameter in the network service header is included in the network service context template, to modify the network service header of the packet to remove the first SFC parameter. The transmitting module is operative to encapsulate the modified packet to include a network service context indicator corresponding to the network service context template and to transmit the encapsulated packet over an overlay network.

In some embodiments, the network service context template comprises a set of configured SFC parameters that can be statically configured.

In some embodiments, the network service header can be modified to remove all SFC parameters included in both the network service context template and the network service header of the packet.

In some embodiments, the overlay network can be selected in accordance with the network service context template.

In some embodiments, responsive to determining that a second SFC parameter in the received network service header is not included in the network service context template, the second SFC parameter can be included in the modified network service header.

In some embodiments, the network service context template can be stored at the first network node.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1a illustrates a Network Service Header format;

FIG. 1b illustrates a Network Service Header MD type 0x1;

FIG. 1c illustrates a Network Service Header MD type 0x2;

DETAILED DESCRIPTION

Figure 2:
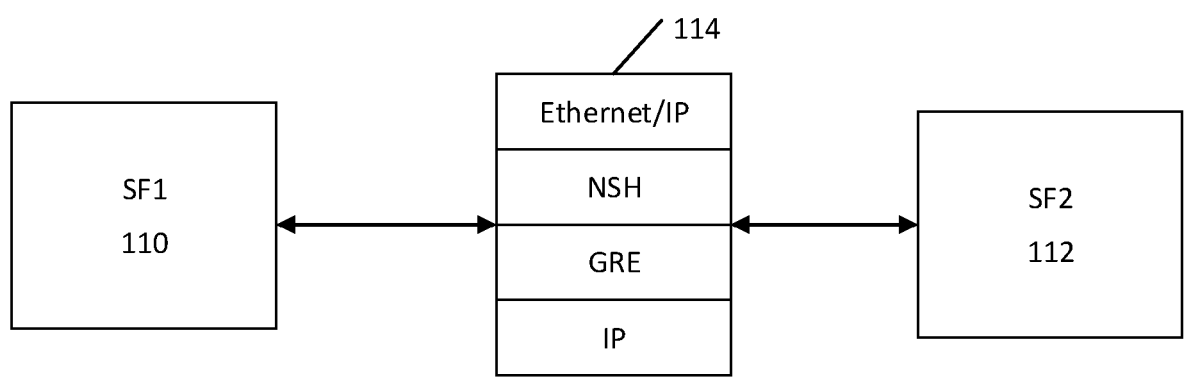
FIG. 2 illustrates an example Network Service Header architecture.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

The following terminology will be used for describing the various embodiments herein.

L2/L3 frame: designates a Layer 2 or Layer 3 datagram that is carried from one SF to another. Typically, L2 or L3 frames may be provided by the end users and be transmitted from one SF to another SF.

Network Service Header (NSH): Sets of parameters (e.g. as metadata) that are provided with the L2/L3 frame. The process of concatenating the L2/L3 frames and the NSH information is referred to as SFC encapsulation.

Network Service Context (NSC): Designates a set of parameters stored within a context. The context can be stored in memory to be accessed by an application. The NSC and NSH should be similar, if not equivalent, in term of information. More specifically, there is a bijection between NSC and NSH.

Network Service Context Identifier (NSC ID): Designates an identifier associated with an NSC instance.

Overlay Network: Designates the way L2 and L3 frames with optional NSH and/or NSC information are carried.

Embodiments of the present disclosure are directed to mechanisms for avoiding issues associated with SFC encapsulation. In some embodiments, the NSH information is not carried in-band, but instead can be locally stored in the various SFs in the form of a Network Service Context (NSC) (e.g. as locally stored parameters). In order to associate a L2 or L3 frame with the appropriate metadata, an overlay network message can carry a NSC Identifier (NSC ID). The NSC ID can be much smaller in size than the full NSH information and can be carried by one or more different layers (or overlay networks) in an option field, for example. A binding between an overlay network and a NSC ID can also be specified.

According to some embodiments, these mechanisms can remove the need for SFC encapsulation. SFC encapsulation can be replaced by the use of NSC and flow management techniques. The use of a NSC indicator can be used to tag a "flow" for a given SFC, which is similar to flow management. The NSC ID can be used to identify a NSC associated with a packet. The information contained in the stored NSC can determine how to process the packet/flow in a similar manner as the conventional NSH information that would be carried by the packet itself. From a design perspective, the replacement of the full NSH information by an NSC indicator can remove one level of encapsulation (e.g. the SFC encapsulation) and reduce the extra overhead caused by appending a NSH to every packet.

From an operational and management perspective, removing the extra SFC overhead makes re-using existing overlay network technologies and existing infrastructure possible. The use of NSH and any network overhead comes with potential risks such as fragmentation, for example, that may result in degrading the network performances.

From a security and privacy perspective, removing NSH information from the packet can avoid a potential leak of information. In some cases, the metadata associated with the L2/L3 frame may include confidential or sensitive information such as an end user's identities or credentials. In some cases such information should not be disclosed.

From a network overlay perspective, removing the NSH overhead can also open the possibility of using alternative overlay networks. More specifically, the introduction of a NSC ID does not require an overlay network that performs encapsulation. As an example, a SF that performs HTTP header enrichment that would conventionally use GRE encapsulation can add a Transmission Control Protocol (TCP) option to carry the NSC ID. Similarly, it also can provide new opportunities for security overlay networks. For example, a L3 frame would be able to use Internet Protocol Security (IPsec) with Tunnel mode and use the Security Parameter Index (SPI) identification tag to carry the NSC ID. This combination can result in providing a secure overlay network with limited costs.

Additionally, the use of NSC does not prevent the deployment of NSH. NSC can remove the SFC encapsulation and provide an advantage when the same NSH information is repeated over numerous L2/L3 frames. In other cases, where the NSH information may be different in many packets, then using NSH can avoid defining a NSC for every differing L2/L3 frame. In this case, NSH, despite its additional overhead, may provide an acceptable way to manage the transmission of metadata. Other cases can fall between these two extreme scenarios and may benefit from combining the advantages of NSC and NSH.

In some scenarios, some number of SF parameters may remain constant whereas some others may have a high degree of variability. If NSH is employed, some portion of the context will be repeated over every L2/L3 frame, whereas some other portion can change for each L2/L3 frames. In such cases, the NSC concept enables placing the static parameters into a defined NSC, which can be stored at the SFs, and thus can allow for specifying only the dynamic metadata in each frame as needed. This approach can still reduce the NSH overhead while also reducing the number of NSCs to manage. The co-existence of NSC and NSH allows for SFC management to be scalable and flexible.

FIG. 2 illustrates an example NSH architecture including two service functions, SF1 110 and SF2 112. The Ethernet/IP packet 114 is the payload transmitted from one SF element to another. Packet 114 is illustrated to show the example layers of encapsulation and information (e.g. NSH, GRE, IP, etc.) used. SFC encapsulation allows for transmitting all necessary information related to the Ethernet/IP packet 114 from a first SF (SF1 110) to the next SF (SF2 112). In the NSH architecture, the SFC parameters are provided with the packet 114 in a NSH. The resulting NSH+Ethernet/IP packet 114 is then encapsulated in a tunnel. In the non-limiting example of FIG. 2, a GRE tunnel is used. Note that the KEY of the GRE Tunnel is not mandatory, and in this embodiment is not shown as being used by NSH.

As previously discussed, the NSH architecture can be particularly useful in cases where the SFC parameters are changing for every packet. NSH does not provide any constraints on the metadata associated with the L2/L3 frame, it allows for carrying any kind of metadata. Providing all of the metadata directly in-band, with the packet 114, can allow for simplicity in implementation.

However, despite its ease of use, the NSH architecture can present a number of drawbacks including large networking overheads, complete disclosure of the SFC parameters and additional encapsulations. The various information (e.g. metadata) included in the NSH increases the packet size, which can result in additional bytes to be transmitted for each IP packet. In addition it may also introduce fragmentation issues.

As all of the NSH parameters are carried in-band, these parameters may also be visible. Even though SFC can be implemented in a trusted environment, billing and identity-based metadata may still be too sensitive to be sent and potentially exposed with every frame. Encryption techniques can be used to avoid disclosing this metadata. In the case where IPsec is used, IPsec in transport mode could be used in combination of GRE but would add yet another encapsulation and additional overhead to the process. The NSH requires first a SFC encapsulation. Then, because NSH does not carry routing information, the NSH and L2/L3 frame needs to be once again encapsulated with an overlay network header. Finally, if authentication or encryption is provided (e.g. IPsec), another encapsulation process is added. All of these levels of encapsulations associated with the original L2/L3 frame may significantly impact the network equipment and performance that may not have been designed for such levels of encapsulations.

Figure 3:
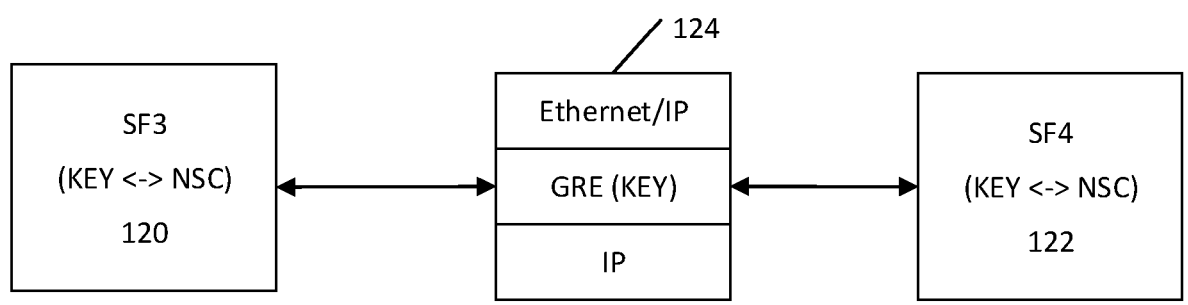
FIG. 3 illustrates an example Network Service Context architecture.

FIG. 3 illustrates an example NSC architecture including two service functions, SF3 120 and SF4 122. In this embodiment, all of the SFC information (which was previously included in the NSH) is associated with a NSC. As such, there is no metadata associated with the Ethernet/IP packet 124 being transmitted from one SF (SF3 120) to another SF (SF4 122). This example architecture can be referred to as the "full NSC" architecture. In this example, there is no NSH information appended to the Ethernet/IP Packet. Instead, each SF 120 and 122 can store a NSC and a binding between a tunnel and the NSC. In some embodiments, this binding can be implemented by using the optional KEY argument of the GRE to lookup the appropriate NSC.

As previously discussed, in a case where some metadata repeats itself in each IP packet 124, then it may be advantageous to define a flow with a specific NSC ID and to bind it with a NSC, thus factorizing the non-changing metadata.

According to some embodiments, the NSC can be stored locally on a SF. It can contain SFC information (metadata) that is not transmitted in the packet 124. It can be composed of the full, or a subset, of the metadata that would be contained in the NSH illustrated in FIG. 2. It will be appreciated that such reduction of the size of the overhead can both limit the number of bytes sent over the network and reduce the chance of fragmentation. The risking of leaking information can be mitigated, as the full metadata is not transmitted over the network with the packet traffic. As the necessity for additional encapsulation is not required, it can also reduce the impact on the network, including the configuration which can affect the control plane.

An Overlay Network to NSC ID Binding Table can also be defined. This binding table can be implemented with one or more tables which can be stored at a SF 120, 122. For example, for an inbound packet, the overlay network can provide a NSC identifier. The table can provide the necessary information to identify the overlay network (source, destination, encapsulation protocols, etc.), the associated NSC ID, as well as the location of the NSC itself. For an outbound packet, the table can provide the necessary information to determine the overlay network from the NSC ID. In some embodiments, an association between a KEY and an NSC can be established. The binding between a KEY and an NSC can be statically or dynamically configured.

Figure 4:
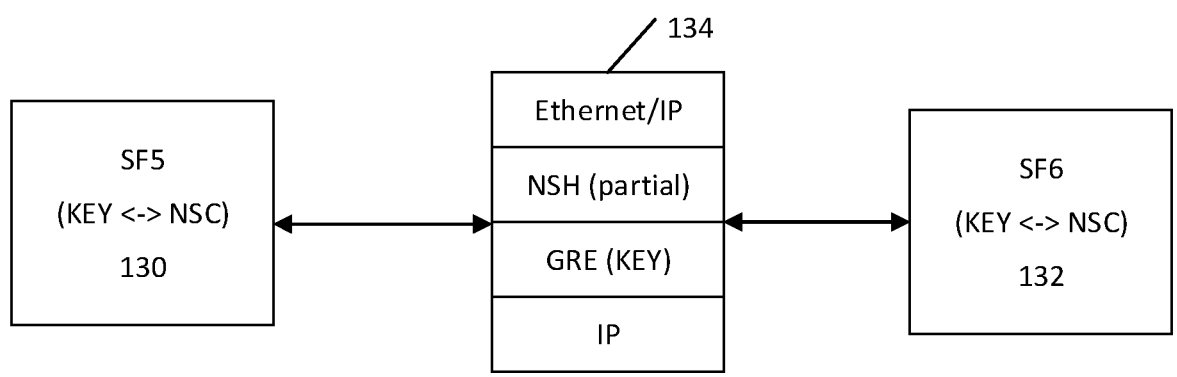
FIG. 4 illustrates an example hybrid NSH-NSC architecture.

FIG. 4 illustrates an example hybrid NSH-NSC architecture including two service functions, SF5 130 and SF6 132. The full NSH architecture example of FIG. 2 required that the entire NSH information be transmitted in-band, while the full NSC architecture example of FIG. 3 required all parameters to be set in a NSC. The hybrid architecture approach allows for partial information to be transmitted in-band with packet 134 and partial information to be set in a NSC and stored at the service functions SF5 130 and SF6 132.

In embodiments of the full NSC architecture, some information that would be sent with every Ethernet/IP packet can be factorized, as opposed to the full NSH architecture. On the other hand, neither of these two architectures allows for partially factorizing some metadata associated with the Ethernet/IP packet 134.

As illustrated in FIG. 4, packet 134 can include a KEY to identify a NSC as well as a NSH. The (partial) NSH information included in the packet 134 and the (partial) NSC information stored at a SF 130/132 can combine to provide the full set of SFC information associated with the packet 134.

In an example scenario, all packets going to a SF 130/132 can share the same set of metadata except for one differing parameter (e.g. the identity of the end user associated with the traffic). In this case, using the conventional NSH architecture would result in redundant information, specifically the static, common parameters that are repeated in every packet. On the other hand, using the NSC architecture would result in the creation of one tunnel (and associated NSC) per end-user. This may not be scalable, especially if the number of end-users is larger than the available number of KEYs.

The hybrid NSH-NSC architecture can address this issue by enabling the NSC to store some parameters while others can be provided in-band using NSH. A set of shared or common parameters can be determined and set as a NSC. Any dynamic or changing parameters can be transmitted in-band.

In some embodiments, a NSC can be defined as an object. The NSC is intended to define the appropriate parameters associated with an Ethernet/IP packet that is to be treated by a SF. Those skilled in the art will appreciate that the structure of a NSC object can be implemented in variety of ways. The following non-limiting example NSC object is provided as an information model only. A NSC object can be composed of the following fields.

NSC Index: used to refer to the appropriate NSC.

NSC Version: the NSC Version format. It differs in the NSH Version field, as different versions of NSC may embed the same version of NSH.

Base Header: defines a structure that represents the Base Header field of the NSH as defined in IEFT draft [draft-ietf-sfc-nsh]. Subfields can include Version, 0 bit, C bit, Length MD Type Next Protocol.

Service Path Header: defines a structure that represents the Service Header Path as defined in IETF draft [draft-ietf-sfc-nsh].

MD Type 1 Context Data: defines the structure associated to the MD Type 1 Context Data. If present, then the MD Type subfield of the NSH or the NSH should be set to 1. Otherwise an error should be reported and the packet can be discarded.

Optional Metadata List: defines the list of options type length values.

```
Network Service Context Object {
  NSC ID:
  NSC Version
  Base Header {
    Version:
    O bit:
    C bit:
    Length:
    MD Type:
    Nex Protocol:
  }
  Service Path Header {
    ServicePath ID:
    Service Index:
  }
  MD Type 1 Context Data {
    Network Platform Context:
    Network Shared Context:
    Service Platform Context:
    Service Shared Context:
  }
  Optional Metadata List: {
    Optional Metadata {
      Option Type:
      Option Value:
    }
    ...
  }
}
```

In some embodiments, a NSC object that is accessed by a SF should have the NSC ID, Base Header, Service Path Header and either the MD Type 1 Context Data or the Optional Metadata List fields. If not, the NSC can be rejected and an error can be raised by the SF.

NSC and NSH can be viewed as alternate ways to provide SFC parameters (metadata) to a SF. In order to maintain compatibility between these two options, it can be defined how metadata using the NSH format can be derived from NSC format and vice-versa. In the case of the full NSC architecture and the NSH architecture, enabling interoperability between NSC and NSH mainly consists in defining a conversion function that can derive an NSH from a NSC (e.g. nsh=nsc-to-nsh(nsc)) and a conversion function that can derive NSC from a NSH (e.g. nsc=nsh-to-=nsc(nsh)).

However, the hybrid architecture considers that some information may be shared between NSC and NSH. All metadata is neither completely stored in a NSC nor completely transmitted in an NSH. Instead, some of the metadata can be provided in a NSC template and some of the metadata can be provided in a reduced/partial NSH. In this case a merger function can be employed to derive a NSC from the NSC template and the reduced NSH (i.e. nsc=merger (nsc_template, reduced_nsh)). Similarly, a splitter function can be employed to generate a reduced NSH from the NSC template and the NSC (i.e. reduced_nsh=splitter(nsc_template, nsc). Such conversion functions between NSC and NSH and the merger/splitter functions can enable interoperability between NSC and NSH.

Figure 5:
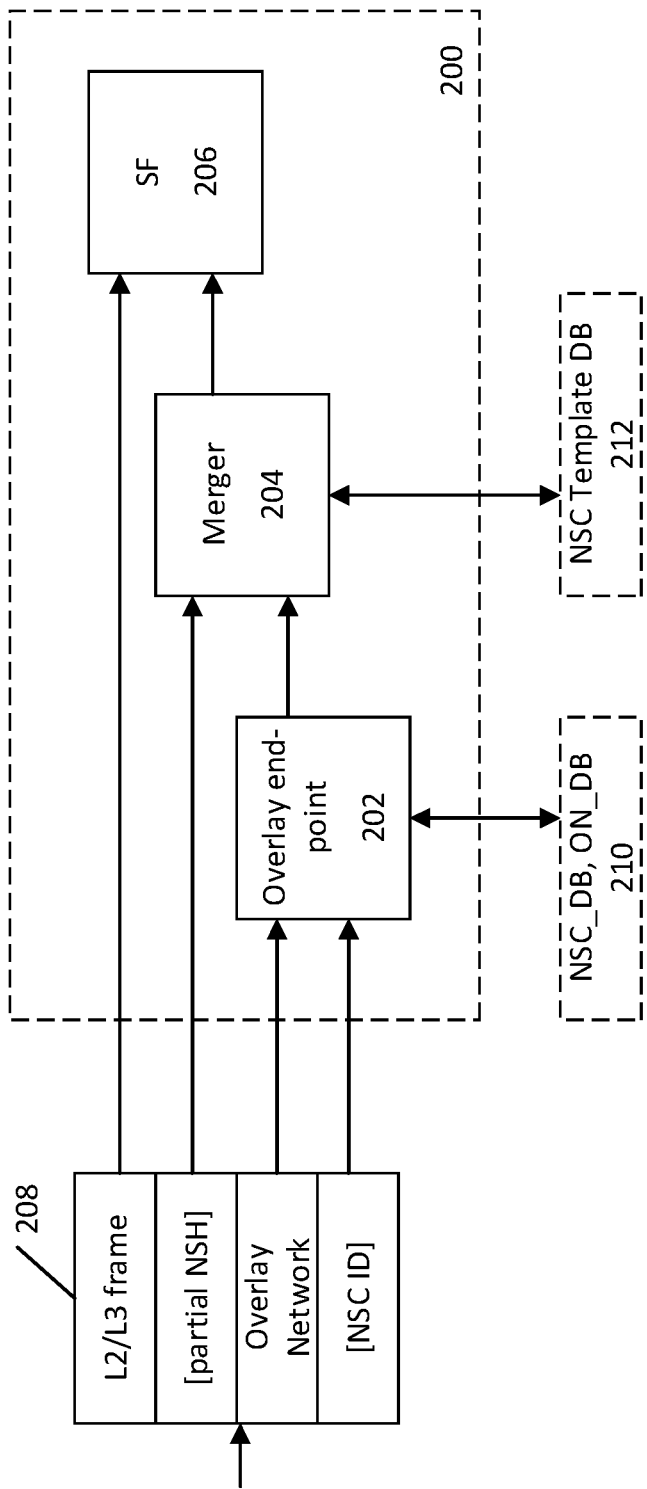
FIG. 5 is a block diagram illustrating an inbound traffic handling example.

FIG. 5 is a block diagram illustrating an inbound traffic handling example. A network node 200 can comprise a number of functions including overlay network endpoint function 202, merger function 204, and service function 206. It will be appreciated that the various functions may not reside in a single network node 200 in all embodiments. For example, SF 206 may be implemented in a first network node while the overlay endpoint 202 and merger 204 functions may be co-located in a second network node.

The overlay endpoint 202 can have access to a NSC database and/or an overlay network database 210 that can be stored locally or remotely. The merger function 204 can have access to a NSC template database 212 that can be stored locally or remotely.

An inbound packet 208 is illustrated as including L2/L3 frame, partial NSH information, overlay network and NSC ID information. The overlay network and/or NSC ID parameters can be used by the overlay endpoint 202 to identify a NSC associated with the packet 208. The merger 204 can combine the NSH parameters carried by packet 208 and the identified NSC to build the full set of SFC parameters associated with packet 208. The SFC parameters and the L2/L3 frame can be provided to the SF 206 so that packet 208 can be properly handled by SF 206.

In some embodiments, a NSC template can be statically configured. The NSC template may not have all of its fields pre-configured and may not be sufficiently specified to be used as a NSC by the SF. Instead, the parameters to be completed can be provided by the partial NSH information of packet 208. The merger function 204 can be configured to generate the NSC from the retrieved NSC template and the partial NSH. The merger function 204 can also be responsible for providing the full set of NSC information to the SF 206.

In some embodiments, the generated NSC can be compatible with the NSH data format as has been described herein. In the case that a SF is only capable of processing a NSH, then the NSC can be converted into a NSH. It is noted that when no NSH parameters are provided in packet 208, the resulting NSC will be equivalent to the retrieved NSC (e.g. the NSC template).

A NSC object is composed of a number of fields, as described above. These fields can be optional in an NSC template. Typically, if a field is present in the NSC template, it should not be provided in the partial NSH. If a field is not specified in the NSC template, it should be specified in the partial NSH. In some embodiments, if a field is specified or absent in both of the NSC template and partial NSH, an error should be generated and the received packet can be discarded. In other embodiments, priority can be configured for one of the NSC template or partial NSH. For example, a field specified in a partial NSH included in a packet may override that field as specified in the NSC template.

In some embodiments, the general principle is that none of the fields in the NSC template should be mandatory. Information that is not provided by the NSC template can be completed by the partial NSH. Once the compatibility operation between NSC and NSH has been completed, the resulting NSC should have the complete information to follow the NSH requirements, so that NSH compliant information can be built if required. If any information is missing and prevents a NSH from being built, the packet can be rejected and an error raised.

According to a non-limiting example, the fields of a NSC template can be defined as follows.

NSC Index: This field is mandatory when NSC template is used.

Base Header: This structure is not mandatory. All these subfields should be specified either in the NSC template or the partial NSH. If a combination of subfields from the NSC template and the partial NSH generate an error, the packet should be rejected.

Service Path Header: This structure is not mandatory. If not present, it should be specified in-band in the partial NSH. All these subfields should be specified either in the NSC template or in the partial NSH. If a combination of subfields from the NSC template and the partial NSH generate an error, the packet should be rejected.

MD Type 1 Context Data: The structure is optional. If not specified in the NSC template, it should be provided by the partial NSH. Each of the subfields is also optional. Any non-specified subfield in the NSC template should be specified in the partial NSH, otherwise an error is generated.

Optional Metadata List: The structure is optional. Options mentioned in the NSC template and in the partial NSH can be merged and provided to the SF. Duplication between options should be checked. It is the responsibility of the SFC architecture to use coherent options between the NSC template and the partial NSH. More specifically, the options are not ordered and there may be no priority defined between the NSC template and the partial NSH.

Figure 6:
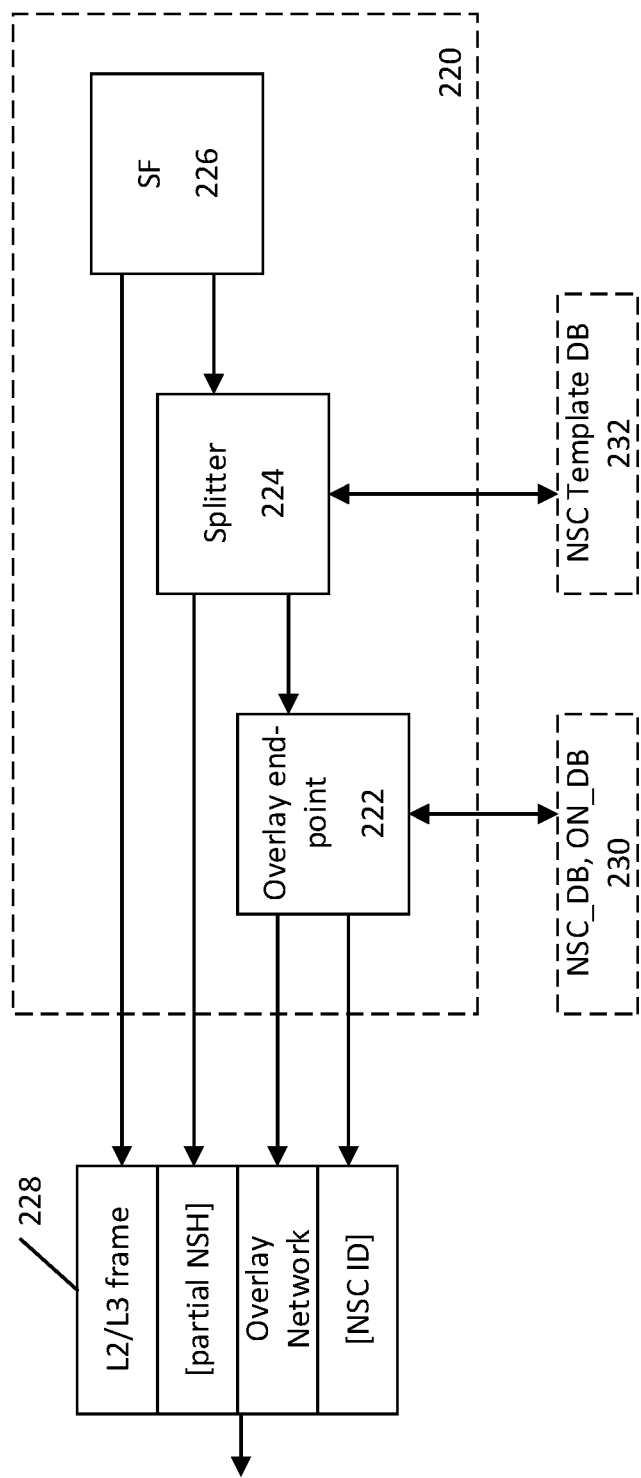
FIG. 6 is a block diagram illustrating an outbound traffic handling example.

FIG. 6 is a block diagram illustrating an outbound traffic handling example. A network node 220 can comprise a number of functions including overlay network endpoint function 222, splitter function 224, and service function 226. It will be appreciated that the various functions may not reside in a single network node 220 in all embodiments. For example, SF 226 can be implemented in a first network node while the overlay endpoint 222 and splitter 224 can be co-located in a second network node.

Similar to FIG. 5, the overlay endpoint 222 can have access to a NSC database and/or an overlay network database 230 that can be stored locally or remotely. The splitter function 224 can have access to a NSC template database 232 that can be stored locally or remotely.

In the outbound traffic example, a NSC and a NSC template can be used together in order to output a reduced NSH. After treating a packet, SF 226 will output the L2/L3 frame and the full set of SFC parameters (e.g. full NSC). The NSC is provided to the splitter function 224, which retrieves the corresponding NSC template. The splitter 224 can identify which parameters are covered by the NSC template. Any parameters that are not present in the NSC template can be formatted into a partial NSH. The splitter outputs the partial NSH information and a NSC identifier to the overlay endpoint 222. The overlay endpoint 222 can determine the NSC ID and select an overlay network for transmitting the outbound packet 228. The outbound packet 228 can include the L2/L3 frame, the partial NSH information derived from the splitter 224, and the NSC ID corresponding to the NSC template used.

In some embodiments, the NSC identifier (or NSC template) and overlay networks are bound together. For inbound traffic, the appropriate NSC and/or NSC template can be derived from the overlay network on which the inbound packet was received. For outbound traffic, the appropriate overlay network can be derived from the NSC. In both cases, a NSC binding table can be used.

In embodiments that include the use of NSC, the overlay network can be used to transport an NSC ID. This NSC ID can be used to identify the NSC associated with the packet. One potential issue is that information for an upper layer will be transmitted within a lower layer. This is different from the conventional NSH architecture where the overlay network does not interact at all with the NSH. In the conventional NSH architecture, the NSH is part of the payload of the ultimate overlay network message. It is noted that using a different overlay network with NSH does not impact NSH, whereas it may impact NSC. The dependencies of these layers can introduce channel bindings.

An overlay network can comprise multiple layers. For example Ethernet, IP, IPsec, and GRE can comprise a single overlay network. On the other hand, each layer may be used to carry the NSC ID. In order to identity and distinguish between different overlay networks, an overlay network should only carry one NSC ID value at a single layer. In other words, a given packet may generate multiple overlay networks objects by setting different NSC IDs at different layers.

For inbound traffic, a binding is needed between an overlay network and associated NSC ID. The NSC Binding Table is used to assess that the NSC ID exists and that the overlay network used is authorized, or at least known, by the NSC. This verification is necessary to avoid overlay networks with weak security being used to inject some traffic associated with the NSC ID. For outbound traffic, the NSC Binding Table provides the reverse mapping as for inbound traffic. The binding is from a NSC or NSC ID to an overlay network.

An example Overlay Network to NSC ID Binding Table is provided as follows. This example structure can be used to identify an overlay network and its associated NSC ID. As previously discussed, as multiple layers can provide an NSC ID, it is important to specify the layer that is expected to provide the NSC ID.

```
Overlay Network
   Overlay Network Object {
      NSC ID =    ## The authorized NSC ID
      layer list = ## description of the overlay network
      NSC ID carrier layer = ## the layer carrying the NSC ID
```

-continued

```
   }
   IP Header {
      src = ip_src
      dst = ip_dst
   }
   Ethernet Header {
      src = eth_src
      dst = eth_dst
   }
   ....
   Ethernet Overlay inherits Overlay Network Object {
      NSC ID = VLAN Tag Information
      layer list = [Ethernet Header, Ethernet Header2]
      NSC ID carrier layer = Ethernet Header
   }
   GRE Overlay inherits Overlay Network Object {
      NSC ID = KEY
      layer list = [Ethernet, IP Header, GRE, Ethernet or IP]
      NSC ID carrier layer = GRE
   }
   VxLAN-gpe Overlay inherits Overlay Network Object{
      NSC ID = VXLAN Network Identifier (VNI)
      layer list = [Ethernet, IP, UDP, Ethernet2]
      NSC ID carrier layer = Ethernet2
   }
```

Figure 7:
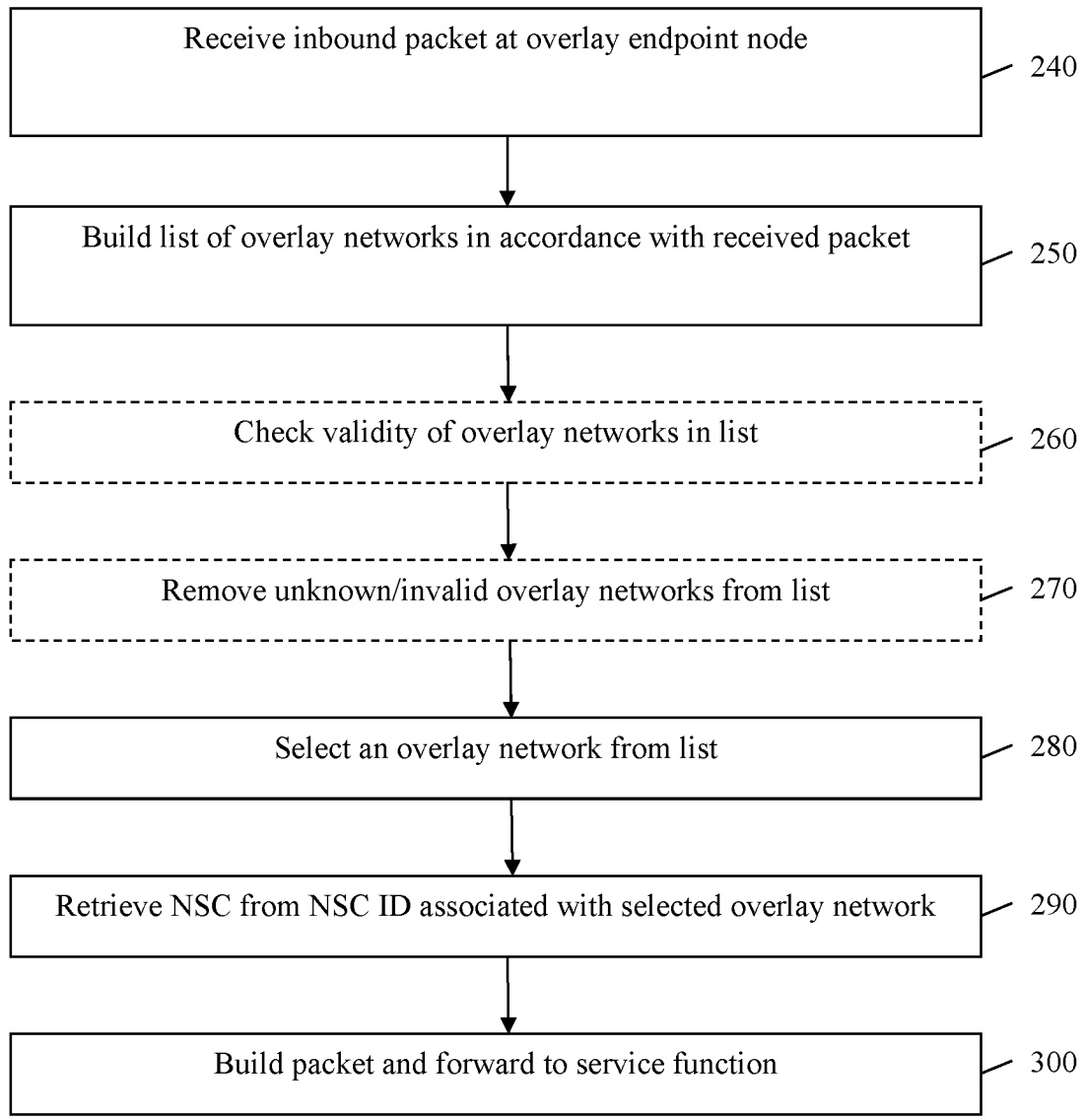
FIG. 7 is a flow chart illustrating a method for establishing a binding between an overlay network and a NSC ID.

FIG. 7 is a flow chart illustrating a method for establishing a binding between an overlay network and a NSC ID. The method begins by receiving an inbound packet (e.g. a packet destined for a service function) at an overlay network endpoint node (block 240). A list of overlay networks can be built in accordance with the received packet (block 250). The received packet can include one or more indications of overlay networks in its various layers. In one example, a GRE tunnel is carried by IPsec. In this case the GRE KEY and/or the IPsec SPI can be considered indications of the NSC(s) corresponding to the overlay network(s). If there are no overlay networks corresponding to the packet, it can be determined that the received packet is not a NSC packet.

The validity of the overlay networks in the network list can be checked by the overlay network node (block 260). This can include verifying known NSC IDs and authorized overlay networks. Any unknown or invalid overlay networks and/or NSC IDs can be removed from the list (block 270). In the case that the list contains a plurality of overlay network, one of the overlay networks can be prioritized and selected (block 280).

The NSC ID corresponding to the selected overlay network can then be identified, and the appropriate NSC can be retrieved (block 290). The NSC comprises a set of SFC parameters associated with the received packet. The packet can then be modified to include the SFC parameters from the retrieved NSC and forwarded towards the destination service function (block 300).

Figure 8:
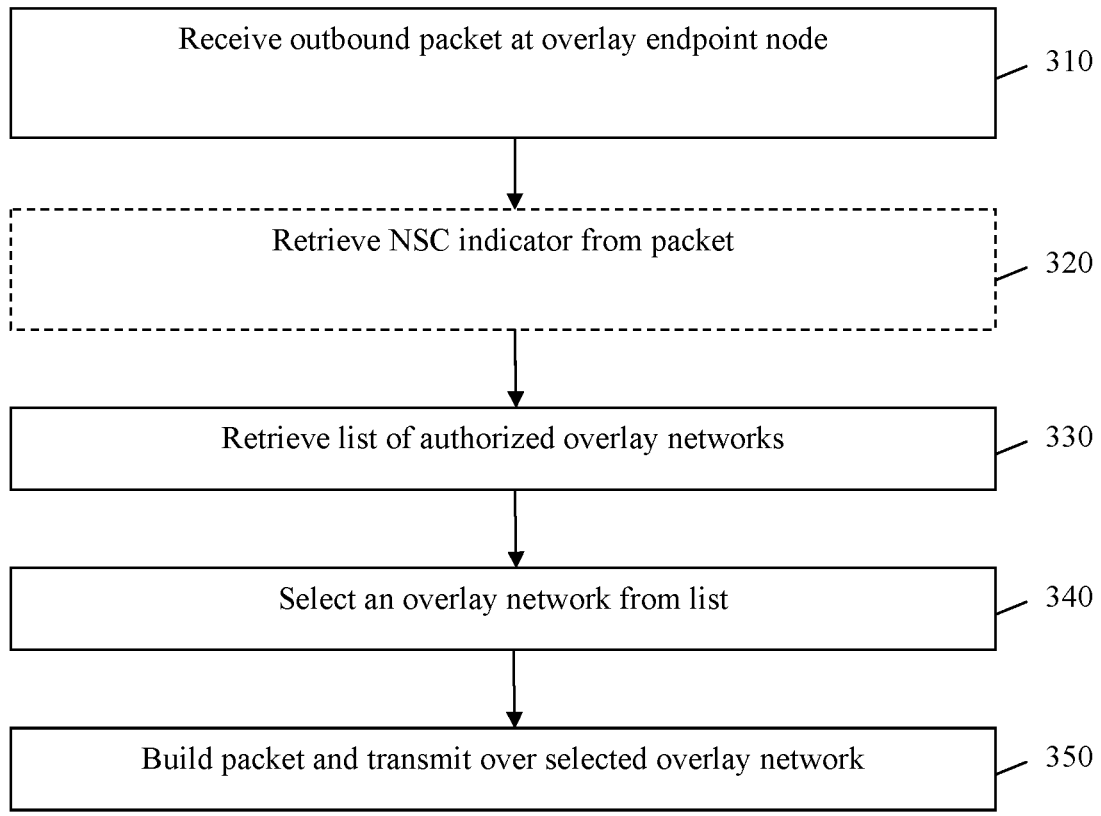
FIG. 8 is a flow chart illustrating a method for selecting an overlay network in accordance with a NSC ID.

For outbound traffic, the overlay network can be selected from the NSC. Multiple overlay networks may be bound to a given NSC. In that case, it may be up to internal policies to define which overlay network to select. FIG. 8 is a flow chart illustrating a method for selecting an overlay network in accordance with a NSC ID.

The method begins by receiving an outbound packet (e.g. a packet departing a service function) at an overlay network endpoint node (block 310). The packet can include an NSC ID or other indication of an NSC. The NSC ID can be retrieved or determined from the received packet and mapped to its corresponding NSC (block 320). A list of available, authorized overlay networks can be retrieved in accordance with the NSC or NSC ID associated with the received packet (block 330). In some embodiments, there can be a plurality of authorized overlay networks in the list. In such embodiments, one overlay network can be prioritized and selected from the list (block 340). The packet is then processed as required for the particular overlay network (e.g. encapsulation, encryption, etc.) and transmitted over the selected overlay network (block 350).

Figure 9:
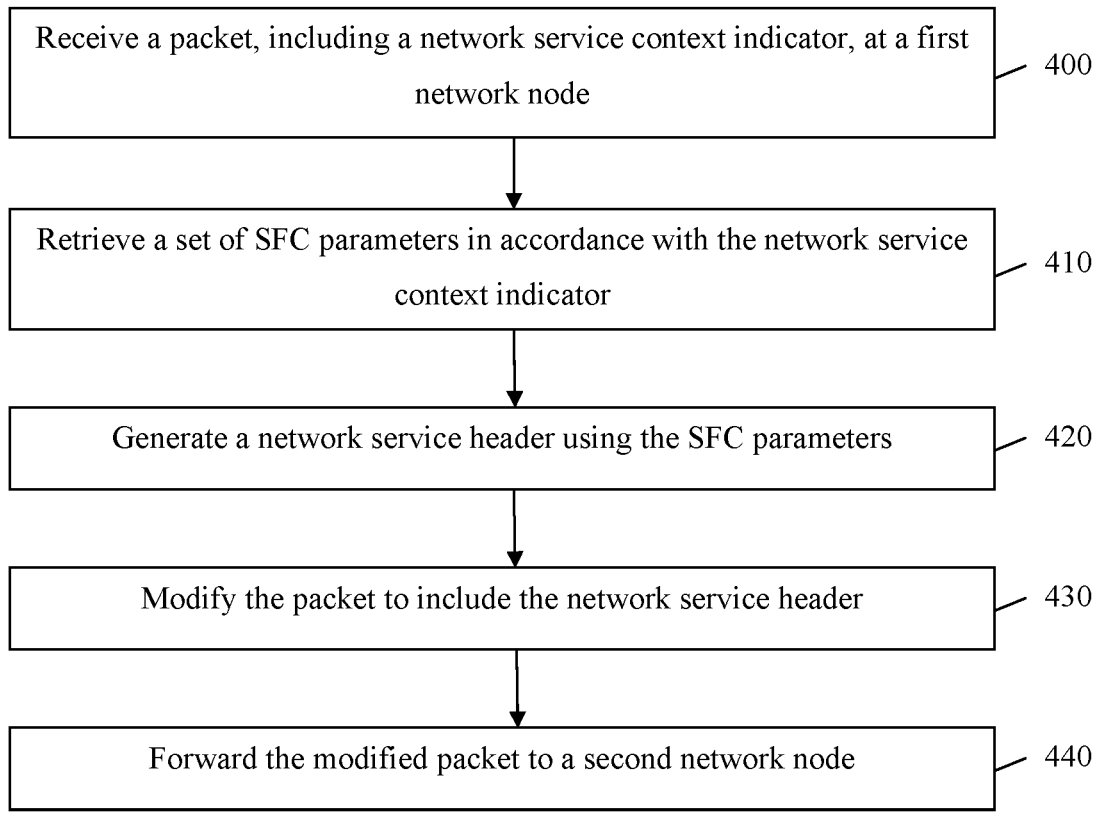
FIG. 9 is a flow chart illustrating a method for processing inbound traffic.

FIG. 9 is a flow chart illustrating a method for processing inbound service function chaining (SFC) network traffic. The method can be performed by a first network node, such as an overlay endpoint node as has been described herein. In some embodiments, the overlay network endpoint, merger function, NSC-overlay network binding, NSC template and/or service function entities can be co-located on a single node or, alternatively, can be distributed over multiple nodes. The inbound SFC network traffic can be processed according to the NSH-NSC hybrid architecture as described herein.

The method begins by receiving a packet over an overlay network (block 400). The packet can include an L2/L3 frame and an indication of a network service context. In some embodiments, the received packet can further include at least one network service parameter. In some embodiments, the received packet can indicate a second network node, such as a service function, as its destination. Upon receipt, the first network node can decapsulate the L2/L3 frame to remove an overlay network header. The overlay network can carry the network service context indication to indicate that the packet is associated with a NSC (e.g. SFC parameters).

A set of SFC parameters is retrieved in accordance with the network service context indicator (block 410). In some embodiments, the SFC parameters can be retrieved further in accordance with the overlay network over which the packet was received. The mapping between the network service context indicator, SFC parameters and optionally the overlay network can be performed using a binding table as has been described herein. In some embodiments, the set of SFC parameters is stored at the first network node. In other embodiments, the set of SFC parameters is accessible by the first network node.

A network service header is generated by the first network node based at least in part on the retrieved set of SFC parameters (block 420). The network service header can be generated to further include any network service parameters that were included in the received packet. The received packet is then modified to include the generated network service header, for example by appending the header to the decapsulated L2/L3 frame (block 430).

The modified packet is forwarded to a second network node (block 440) in accordance with the generated network service header. In some embodiments, the second network node can be a service function indicated as a destination in the generated network service header (e.g. via the Service Path Identifier and a Service Index fields). In some embodiments, the second network node can be a service function indicated as a destination in the original received packet.

Figure 10:
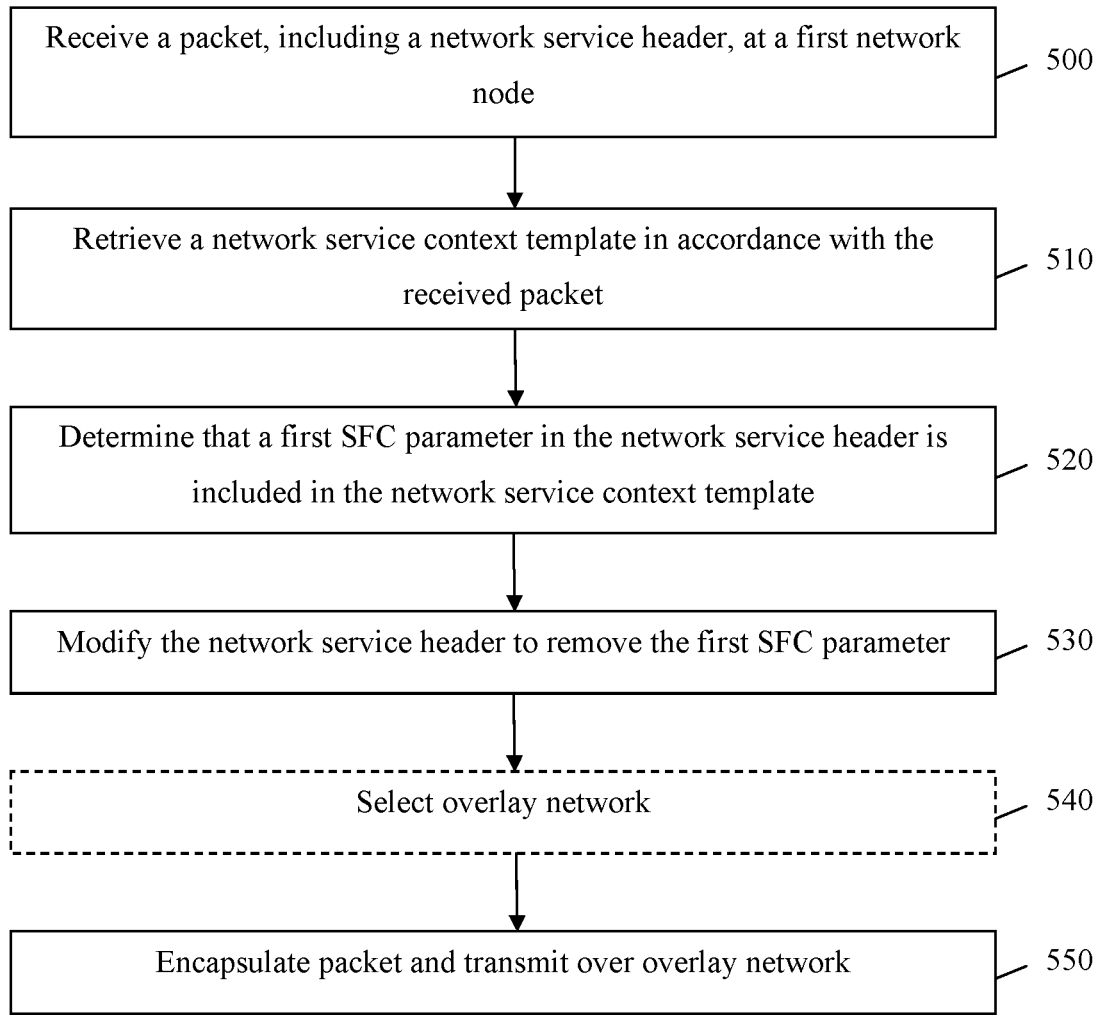
FIG. 10 is a flow chart illustrating a method for processing outbound traffic.

FIG. 10 is a flow chart illustrating a method for processing outbound service function chaining (SFC) network traffic. The method can be performed by a first network node, such as an overlay endpoint node as has been described herein. In some embodiments, the overlay network endpoint, splitter function, NSC-overlay network binding, NSC template and/or service function entities can be co-located on a single node or, alternatively, can be distributed over multiple nodes. The outbound SFC network traffic can be processed according to the NSH-NSC hybrid architecture as described herein.

The method begins by receiving a packet at the first network node (block 500). The packet can include an L2/L3 frame and network service header. The network service header can include at least one SFC parameter. The packet can be received by the first network node from a service function.

A network service context template is retrieved in accordance with the received packet (block 510). The network service context template can comprise a set of statically configured SFC parameters. In some embodiments, the network service context template is stored at the first network node. In other embodiments, the network service context template is accessible by the first network node. In some embodiments, the network service context template can be retrieved in accordance with at least one parameter of the received packet, which can be included in the network service header or elsewhere in the packet. In some embodiments, the network service context template can be selected from a plurality of network service context templates. In some embodiments, the received packet can include a NSC ID which can be used as an index to retrieve the template. It should be noted that NSC, NSC ID and NSC template may be different from those specified for the inbound traffic embodiments described herein.

The network service header can then be compared to the retrieved network service context template to determine if any of the SFC parameters in the network service header are also present in the network service context template. It is determined that a first SFC parameter in the network service header is included in the network service context template (block 520). The network service header of the packet is modified to remove the first SFC parameter (block 530). It will be appreciated that one or more SFC parameters may be determined to exist in both the network service header and the network service context template. In some embodiments, all duplicate SFC parameters can be removed from the network service header of the packet. In some embodiments, only unique SFC parameter(s) will remain in the modified network service header. In some embodiment, any SFC parameters that are not included in the network service context template can be formatted into a NSH format.

Optionally, an overlay network can be selected (block 540). The first network node can select an appropriate overlay network in accordance with the network service context and/or network service context template that was associated with the packet.

The packet can then be encapsulated and transmitted over the overlay network (block 550). The packet can include the modified network service header and the L2/L3 frame. The modified header can be appended to the L2/L3 frame prior to encapsulation. The packet can be encapsulated to include a network service context indicator that corresponds to the network service context template that was used to modify the network service header.

Figure 11:
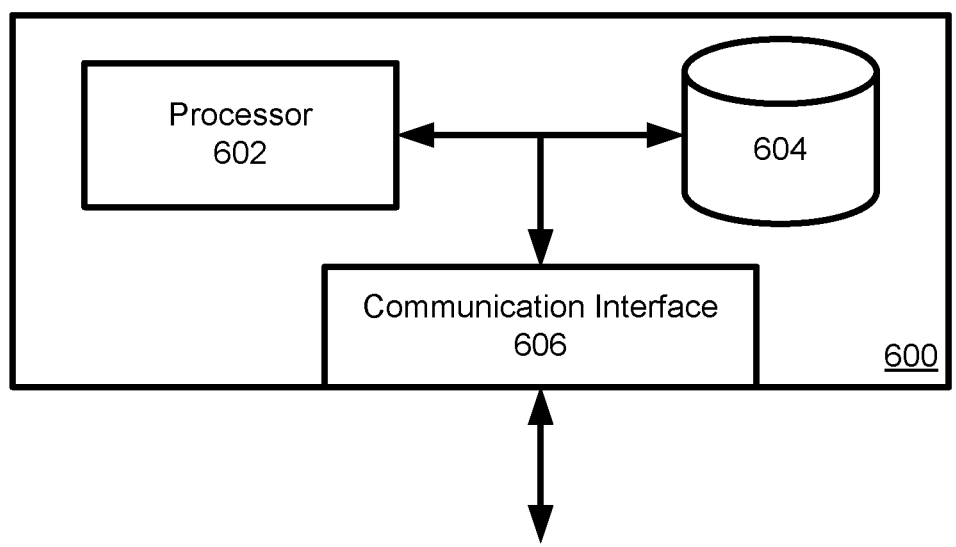
FIG. 11 is a block diagram of a network node.

FIG. 11 is a block diagram illustrating an example network node 600 according to embodiments of the present invention. Network node 600 can be any of the service function, overlay network end point, merger function and/or splitter function nodes as have been described herein. The network node 600 includes circuitry including a processor 602, a memory or instruction repository 604 and a communication interface 606. The communication interface 606 can include at least one input port and at least one output port. The memory 604 contains instructions executable by the processor 602 whereby the network node 600 is operable to perform the various embodiments as described herein. In some embodiments, the network node 600 can included virtualized components hosted by the underlying physical hardware. Network node 600 can be configured to implement any of the methods and procedures illustrated in FIGS. 5-10.

Figure 12:
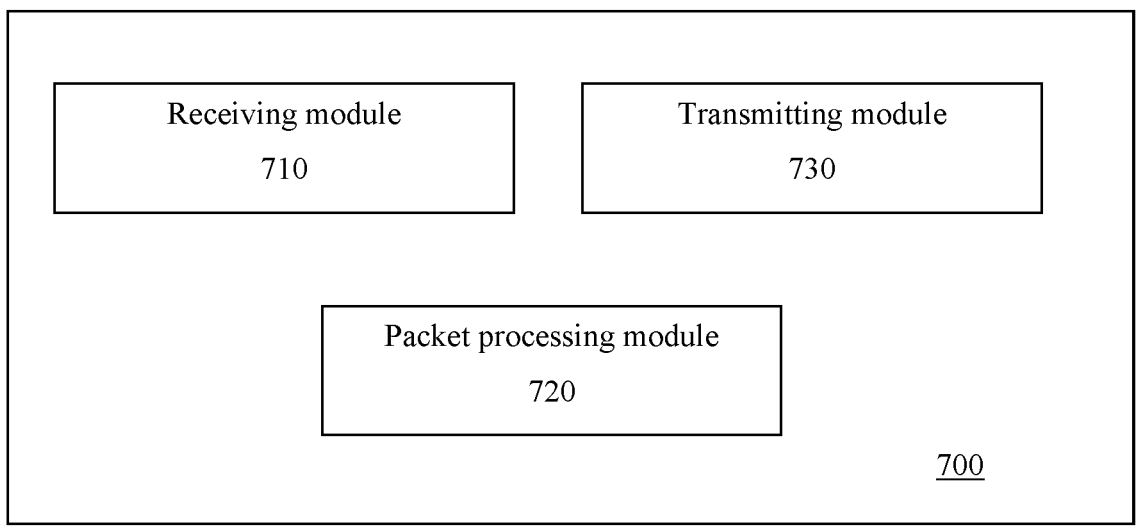
FIG. 12 is a block diagram of an overlay network endpoint.

FIG. 12 is a block diagram of an overlay network endpoint node 700. Node 700 includes a receiving module 710, a packet processing module 720 and a transmitting module 730. Overlay network endpoint 700 is operative to process inbound and outbound service function chaining (SFC) network traffic.

When handling inbound traffic, receiving module 710 is operative to receive a packet an overlay network, the packet including a network service context indicator. Packet processing module 720 is operative to retrieve a set of SFC parameters in accordance with the network service context indicator, generate a network service header based at least in part on the set of SFC parameters and modify the packet to include the generated network service header. Transmitting module 730 is operative to forward the modified packet to a second network node in accordance with the generated network service header.

When handling outbound traffic, receiving module 710 is operative to receive a packet including a network service header, the network service header including at least one SFC parameter. Packet processing module 720 is operative to retrieve a network service context template and, responsive to determining that a first SFC parameter in the network service header is included in the network service context template, modify the network service header of the packet to remove the first SFC parameter. Transmitting module 730 is operative to encapsulate the modified packet to include a network service context indicator corresponding to the network service context template and transmit the encapsulated packet over an overlay network.

In general, mechanisms are provided for packet handling and steering in a service function chaining network such that the full metadata associated with a packet need not be appended to the packet itself. At the ingress node to the network, a received packet can be classified and associated with a service function chain or a "flow". An identifier of the flow can be added to the packet (e.g. as a NSC ID) such that the full metadata related to the flow (e.g. the NSH) is not required to be appended to the packet. The packet can be forwarded to a subsequent node in the network, where the flow identifier can be used as a lookup key to identify the full metadata (e.g. the NSC) associated with the flow. The packet can then be processed in accordance with the full metadata context.

In some embodiments, the ingress node can identify shared (e.g. static) parameters and/or unique (e.g. dynamic or changing) parameters associated with the received packet. The unique parameters can be appended to the packet along with the flow indicator, prior to forwarding the packet to the subsequent node. The subsequent node can optionally perform its lookup using both the flow identifier and the unique parameters. The packet can be processed in accordance with the full metadata context and the unique parameter as required. Optionally, the subsequent node can add or modify unique parameters to the packet prior to forwarding on in the service function chaining network.

In some embodiments, an egress node in the network can remove any flow indicators and/or parameters associated with the service function chaining network from the packet prior to forwarding the packet to its destination.

In some embodiments, a NSC controller or management entity can be configured to distribute NSC information to the various nodes in the network.

Embodiments of the present invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for processing inbound service function chaining (SFC) network traffic, comprising:
   receiving a packet at a first network node over an overlay network, the packet including at least one network service parameter and a network service context indicator identifying a network service context associated with the packet, the network service context indicator being smaller in size than a corresponding network service header and the network service context indicator being used to generate the network service header by:
      retrieving a set of SFC parameters in accordance with the network service context indicator; and
      generating the network service header based at least in part on the retrieved set of SFC parameters and the at least one network service parameter;
   modifying the packet to include the generated network service header; and
   forwarding the modified packet to a second network node in accordance with the generated network service header.

2. The method of claim 1, wherein the second network node is a service function indicated as a destination in the generated network service header.

3. The method of claim 1, further comprising, retrieving the set of SFC parameters further in accordance with the overlay network over which the packet was received.

4. The method of claim 1, further comprising, decapsulating the received packet to remove an overlay network header.

5. The method of claim 1, wherein modifying the packet includes appending the generated network service header to the packet.

6. The method of claim 1, wherein the set of SFC parameters is stored at the first network node.

7. A first network node comprising circuitry including a processor and a memory, the memory containing instructions executable by the processor whereby the first network node is operative to:
    receive an inbound packet at the first network node over an overlay network, the packet including at least one network service parameter and a network service context indicator identifying a network service context associated with the packet, the network service context indicator being smaller in size than a corresponding network service header and the network service context indicator being used to generate the network service header by:
        retrieve a set of service function chaining (SFC) parameters in accordance with the network service context indicator; and
        generate the network service header based at least in part on the retrieved set of SFC parameters and the at least one network service parameter;
    modify the packet to include the generated network service header; and
    forward the modified packet to a second network node in accordance with the generated network service header.

8. The first network node of claim 7, wherein the second network node is a service function indicated as a destination in the generated network service header.

9. The first network node of claim 7, further operative to, retrieve the set of SFC parameters further in accordance with the overlay network over which the packet was received.

10. The first network node of claim 7, further operative to, decapsulate the received packet to remove an overlay network header.

11. The first network node of claim 7, wherein modifying the packet includes appending the generated network service header to the packet.

12. A method for processing outbound service function chaining (SFC) network traffic, comprising:
    receiving a packet at a first network node, the received packet including a network service header, the network service header including at least one SFC parameter and at least one network service parameter;
    retrieving a network service context template in accordance with the received packet, wherein the network service context template comprises a set of configured SFC parameters;
    responsive to determining that a first SFC parameter in the network service header is included in the network service context template, modifying the network service header of the packet to remove the first SFC parameter;
    encapsulating the modified packet to include a network service context indicator identifying a network service context associated with the packet and corresponding to the network service context template, the network service context indicator being smaller in size than the corresponding network service header, and the network service context indicator and the at least one network service parameter being used to generate the network service header; and
    transmitting the encapsulated packet over an overlay network.

13. The method of claim 12, wherein the set of SFC parameters are statically configured.

14. The method of claim 12, further comprising, modifying the network service header to remove all SFC parameters included in both the network service context template and the network service header of the packet.

15. The method of claim 12, further comprising, selecting the overlay network in accordance with the network service context template.

16. The method of claim 12, further comprising, responsive to determining that a second SFC parameter in the received network service header is not included in the network service context template, including the second SFC parameter in the modified network service header.

17. The method of claim 12, wherein the network service context template is stored at the first network node.

18. A first network node comprising circuitry including a processor and a memory, the memory containing instructions executable by the processor whereby the first network node is operative to:
    receive an outbound packet at the first network node, the received packet including a network service header, the network service header including at least one service function chaining (SFC) parameter and at least one network service parameter;
    retrieve a network service context template in accordance with the received packet, wherein the network service context template comprises a set of configured SFC parameters;
    responsive to determining that a first SFC parameter in the network service header is included in the network service context template, modify the network service header of the packet to remove the first SFC parameter;
    encapsulate the modified packet to include a network service context indicator identifying a network service context associated with the packet and corresponding to the network service context template, the network service context indicator being smaller in size than the corresponding network service header, and the network service context indicator and the at least one network service parameter being used to generate the network service header; and
    transmit the encapsulated packet over an overlay network.

19. The first network node of claim 18, wherein the set of SFC parameters are statically configured.

20. The first network node of claim 18, further operative to, modify the network service header to remove all SFC parameters included in both the network service context template and the network service header of the packet.

21. The first network node of claim 18, further operative to, select an overlay network in accordance with the network service context template.

22. The first network node of claim 18, further operative to, responsive to determining that a second SFC parameter in the received network service header is not included in the network service context template, include the second SFC parameter in the modified network service header.

* * * * *